April 30, 1946.     T. J. SMULSKI     2,399,399
WIPER BLADE CONNECTOR
Filed Nov. 16, 1942
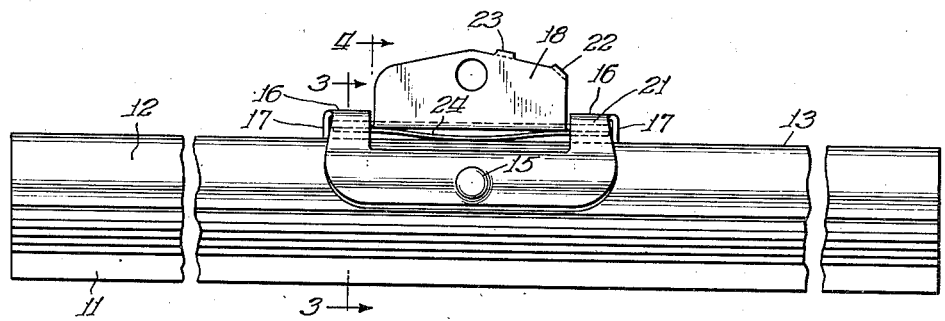
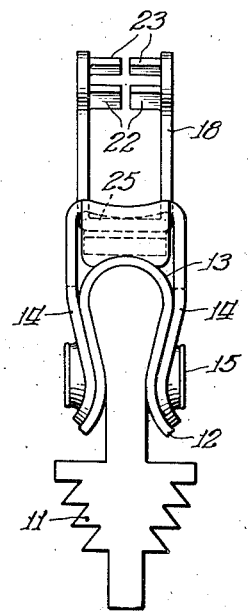
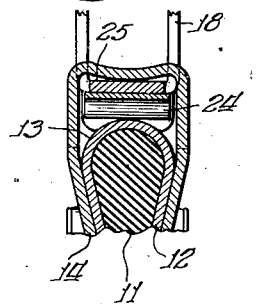
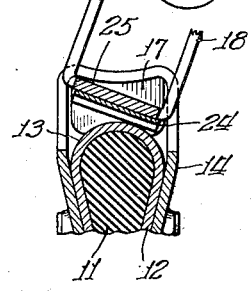
Inventor:
Theodore J. Smulski
By: Alois W. Graf
Atty.

Patented Apr. 30, 1946

2,399,399

UNITED STATES PATENT OFFICE 2,399,399

WIPER BLADE CONNECTOR

Theodore J. Smulski, Gary, Ind., assignor to Productive Inventions, Inc., a corporation of Indiana Application November 16, 1942, Serial No. 465,669

5 Claims. (Cl. 15—250)

My invention relates to windshield wipers and more particularly to a device for interconnecting a windshield wiper arm with a windshield wiper blade.

Windshield wiper blades comprise a flexible wiping element supported by a relatively rigid metal frame which generally has a convex upper surface. For the best wiping operation it has been found advantageous to have the wiping element inclined with respect to the surface being cleaned and to assist in obtaining this desired position means are provided for permitting the blade frame to assume an inclined position relative to the surface to be wiped or cleaned. At the end of a wiping stroke the blade element and frame flops or turns over to assume a corresponding angle with respect to the windshield in the other direction. This means generally comprises a connector device between the blade frame and the wiper arm which device must be positively held in operative relation so as to prevent chattering of the wiper element across the surface to be cleaned. Such connector may comprise a clip-like member extending longitudinally along and secured to the blade frame at an intermediate point thereon. A resilient means is provided within such a member to normally maintain a substantial transverse alignment between the two members forming the connector between the blade and the actuating arm, but to permit oscillation therebetween so that the wiper blade may assume the desired angular position. It has been found that such clip members are subjected to such a strain due to this reversal of the blade frame at the end of each stroke as to frequently cause the clip member to become distorted or fail in service. Furthermore there has been an appreciable noise occurring from the reversal of position of the blade frame and element at the end of each stroke.

Therefore it would be desirable to provide an improved type of connector which would not be liable to become distorted or to fail in service. Furthermore, in addition to a longer life of the connector it is desirable to minimize, if not entirely eliminate noise. In accordance with the present invention a clip-like member is provided with an inner convex surface so that a hanger member cooperating therewith will permit oscillation of the blade frame and element at the end of each stroke by a rocking movement between these parts thereby eliminating a sudden snap action or thrust at the end of each stroke. By providing a relative rocking movement between the clip and hanger there is also obtained an appreciable reduction in the noise occurring at the end of each wiping stroke.

Therefore it is an object of my invention to provide an improved device for interconnecting a windshield wiper arm with a windshield wiper blade which will overcome certain of the above mentioned disadvantages of the prior art.

A further object of my invention is to provide an improved connector device for a windshield wiper blade and arm which will have an increased life and which will be less noisy than prior devices.

Other and further objects of my invention will become readily apparent by reference to the following description taken in connection with the accompanying drawing wherein Figure 1 is a side view of a wiper blade provided with a connector device constructed in accordance with the present invention; Figure 2 is an end view of the device shown in Figure 1; Figure 3 is a cross section along the line 3—3 of Figure 1; Figure 4 is a cross section along the line 4—4 of Figure 1; and Figure 5 is a perspective view of the clip portion of the connector comprising my invention.

Referring more particularly to Figures 1 and 2 of the drawing it will be seen that there is shown a wiper blade comprising a flexible wiper element 11 supported within a relatively rigid channel-like frame 12 which has an upper convex surface 13. At an intermediate point on the wiper frame 12 there is provided a clip member, shown in perspective in Figure 5, which has a pair of leg portions 14 arranged to engage the sides of the blade channel 12. Preferably the sides 14 of the clip member are further secured to the blade frame 12 by suitable fastening means 15 which may comprise a rivet. In between the two leg portions 14 of the clip member at the opposite ends thereof there are bight portions 16 which are spaced above the upper surface 13 of the wiper frame 12. Each bight portion 16 is provided substantially throughout its width with a configuration of slight transverse curvature so that the inner surface thereof is convex and opposed in position with respect to the convex upper surface 13 of the frame 12. At each end of the clip member a depending end portion 17 is desirably provided to close the adjacent bight portion of the clip, and where a single rivet fastening means is provided as shown these end portions 17 may engage the upper portion of the blade frame 12, thereby to determine accurately the spacing of the bight portion 17 with respect to the arcuate portion of the blade frame.

A hanger member having a body portion 18 extending upwardly through an opening 19 of the clip member is provided with a pair of end portions 21, each of which is positioned within one of the bight portions 17 of the clip 14. The body portion 18 of the hanger may be formed of two upwardly extending parallel members having adjacent one end thereof inwardly projecting portions 22 so as to form a bight portion. At an intermediate point two more inwardly projecting members 23 are provided so as to form another bight portion. These bight portions 22 or 23 are adapted to be engaged by a member attached to the free end of a windshield wiper arm which member may comprise a hook. A bowed spring leaf member 24 is positioned within the confines of the clip member 14 and preferably is located between the upper convex surface 13 of the blade frame 12 and the underside of the hanger member 18. The member 24 desirably extends substantially the entire length of the clip member 14 into the bight portions 16 thereof.

The member 24 normally maintains substantially a fore and aft alignment between the clip member 14 and the hanger member 18. Thus the resilient spring 24 normally urges the clip and wiper blade into the same plane as that in which the hanger member is located. Thus the resilient spring 24 tends to urge the clip and blade into a position such as shown in Figure 3 wherein it will be seen that the inner surface 25 of the hanger is in engagement with the central portion of the convex surface of the bight portions 16 of the clip. This position is obtained either at the time when the wiper blade is parked or as the blade is flopping over as an incident of a reversal of direction of movement of the wiper arm.

In Figure 4 there is represented the position assumed by the clip member 14 with respect to the hanger member 18 during a wiping stroke. In this position the surface 25 of the hanger 18 is in engagement with outer side portions of the convex surfaces of the clip. The under surfaces of the end portions 21 of the hanger 18 are engaged by the extremities of the resilient spring member 24 which in turn has been compressed so that the spring, throughout the greater portion of its length, is in substantial engagement with the convex surface 13 of the blade frame 12. At a reversal of direction of movement of the wiper arm the surface 25 of the hanger 18 will rock across the entire convex surface of the bight portions 16 until the hanger 18 is inclined at an angle corresponding to that shown, but in the opposite direction. The wiper blade thereupon is in position to proceed with a new wiping stroke. By having the inner surface 25 of a hanger member 18 in rocking engagement with the rocking portions 16 of the clip 14 there is no sudden shift between the hanger and clip, and hence there is an appreciable reduction in the noise. Furthermore, less strain is applied to the bight portions of the clip 14. Thus the life of the device is caused to be lengthened without increasing the mass or weight of the clip member. It is highly desirable to maintain at a minimum the weight or mass of a windshield wiper blade and arm so as to reduce the strain on the arm and on the windshield wiper actuating mechanism. As will be readily appreciated the sudden reversal of the direction of movement of the wiper blade and arm at the end of each stroke places considerable strain on all of the elements and hence it is particularly advantageous to provide any arrangement whereby improved operation or life of the equipment may be obtained without any increase in the mass of the material to be moved by the wiper actuating mechanism.

While for the purpose of illustrating and describing my invention a particular embodiment thereof has been shown, it is to be understood that such modifications may be made therein as may be commensurate with the spirit and scope of the appended claims.

What I claim as new and desire to secure by Letters Patent of the United States is:

1. A device for connecting a windshield wiper arm to a wiper blade which includes a blade frame comprising, in combination, a clip attached to the blade frame and having a base spaced from the blade frame, a hanger attachable to the wiper arm and having a base extending into the space between the blade frame and the clip base, a spring interposed between the blade frame and the base of the hanger whose tendency is to force the blade frame away from the hanger base and the base of the clip into directly confronting contacting relation to the base of the hanger, said bases of the clip and hanger being formed throughout portions of their lengths to present broad opposed relatively rockable faces of slight relative transverse curvature to one another, such relative curvature extending throughout the width of the opposed surfaces, and the total relative change of angularity of said surfaces being not substantially greater than the limited angle through which the clip is transversely tiltable relative to the hanger, as determined by the spacing of the blade frame from the clip base.

2. A device for connecting a windshield wiper arm to a wiper blade having a wiping element frame provided with a convex upper surface and including a clip having spaced leg portions for securing the clip to the sides of the blade frame, said clip having at each end a bight forming portion including a base spaced from the top surface of said frame, a hanger having a body portion extending through an opening in said clip between said bight portions, said hanger having end portions positioned within the respective bight forming portions of said clip, and a resilient member interposed between said hanger and said frame, the tendency of said resilient member being to urge the bight bases and the clip ends into directly confronting, contacting relation, said bight bases and clip ends being formed to present broad opposed relatively rockable faces of slight relative transverse curvature to one another, such relative curvature extending throughout the width of the opposed surfaces, and the total relative change of angularity being not greater than the limited angle through which the clip is transversely tiltable relative to the hanger as determined by the spacing of the blade frame from the bight bases.

3. A device for connecting a windshield wiper arm to a wiper blade which includes a blade frame comprising, in combination, a clip attached to the blade frame and having a base spaced from the blade frame, a hanger attachable to the wiper arm and having a base extending into the space between the blade frame and the clip base, a spring interposed between the blade frame and the base of the hanger whose tendency is to force the blade frame away from the hanger base and the base of the clip into directly confronting, contacting relation to the base of the hanger, said bases of the clip and hanger being formed throughout portions of their lengths to present broad opposed relatively rockable faces, one of said faces being flat and the other being slightly transversely convex throughout its width, the total angle comprehended by the convex face being not greater than the limited angle through which the clip is transversely tiltable relative to the hanger as determined by the spacing of the blade frame from the base of the clip.

4. A device for connecting a windshield wiper arm to a wiper blade which includes a blade frame comprising, in combination, a clip having spaced leg portions for engaging the sides of the blade frame and a base spaced from the blade frame, said clip having at each end thereof a bight forming portion, a hanger having a body portion extending through an opening in said clip and end portions extending into the bights, the end portions of the hanger and the bight forming portions of the clip base having broad faces disposed in confronting relation to one another, a spring interposed between the hanger and the blade frame whose tendency is to urge the bight forming portions of the clip base into directly confronting, contacting relation to the end portions of the hanger, said end portions of the hanger being formed to present flat faces toward the opposed surfaces of the clip, and said opposed surfaces of the clip being continuously transversely convex and of slight curvature throughout the widths thereof, the total angle comprehended by the convex surfaces being not greater than the limited angle through which the clip is transversely tiltable relative to the hanger as determined by the spacing of the blade frame from the clip base.

5. In a windshield wiper arm and blade connector, in combination, a first arm carried member, a second member rigidly connected to the wiper blade, said members having broad opposed surfaces which have a slight relative transverse curvature to one another adapting the second member for rocking from side to side on the first as the wiper is operated back and forth, means for positively limiting rocking of said second member, and spring means urging the second member toward the first and biasing it towards a neutral position intermediate the limits of its rocking movement, the relative curvature of said members extending throughout the width of the opposed surfaces and the total relative change of angularity of said surfaces being not substantially greater than the limited angle through which the second member is transversely tiltable relative to the first.

THEODORE J. SMULSKI.